(12) United States Patent
Liu et al.

(10) Patent No.: US 11,225,228 B2
(45) Date of Patent: Jan. 18, 2022

(54) METHOD FOR ENHANCING IN-PATH OBSTACLE DETECTION WITH SAFETY REDUNDANCY AUTONOMOUS SYSTEM

(71) Applicant: Baidu USA LLC, Sunnyvale, CA (US)

(72) Inventors: Xiaodong Liu, San Jose, CA (US); Ning Qu, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 110 days.

(21) Appl. No.: 16/815,734

(22) Filed: Mar. 11, 2020

(65) Prior Publication Data

US 2021/0284108 A1 Sep. 16, 2021

(51) Int. Cl.
*B60T 7/22* (2006.01)
*G06K 9/00* (2006.01)
*B60W 30/18* (2012.01)
*B60W 10/18* (2012.01)
*B60W 60/00* (2020.01)

(52) U.S. Cl.
CPC ............... *B60T 7/22* (2013.01); *B60W 10/18* (2013.01); *B60W 30/18109* (2013.01); *B60W 60/0011* (2020.02); *G06K 9/00805* (2013.01); *B60W 2710/18* (2013.01); *B60Y 2300/09* (2013.01); *B60Y 2300/0954* (2013.01)

(58) Field of Classification Search
CPC ........................................................ B60T 7/22
See application file for complete search history.

(56) References Cited

U.S. PATENT DOCUMENTS

| | | | | |
|---|---|---|---|---|
| 4,437,533 A | * | 3/1984 | Bierkarre | B60K 31/0066 180/168 |
| 7,673,950 B2 | * | 3/2010 | Fulks | B60T 7/22 303/193 |
| 7,979,174 B2 | * | 7/2011 | Fregene | B60W 50/0097 701/23 |
| 8,020,657 B2 | * | 9/2011 | Allard | G05B 19/414 180/167 |
| 8,874,300 B2 | * | 10/2014 | Allard | G05D 1/0088 701/25 |
| 9,969,270 B2 | * | 5/2018 | Luke | B60L 7/26 |
| 10,933,866 B2 | * | 3/2021 | Ando | B60Q 9/00 |
| 10,981,450 B2 | * | 4/2021 | Luke | B60L 58/12 |

(Continued)

*Primary Examiner* — Shelley Chen
(74) *Attorney, Agent, or Firm* — Womble Bond Dickinson (US) LLP

(57) ABSTRACT

In one embodiment, a method for performing an obstacle detection for an ADV includes detecting an obstacle by a primary ADS and a secondary ADS using an obstacle detection algorithm based on sensor data provided by sensors on the ADV. In response to detecting the obstacle, a first controlled stop distance and a second controlled stop distance are calculated by the primary ADS and secondary ADS respectively based on a speed and a deceleration capability of the ADV. The first and second controlled stop distances between the primary ADS and secondary ADS are exchanged to determine a third controlled stop distance which is the maximum of the two. In response to determining that the ADV reaches within the third controlled distance between the ADV and the obstacle, a controlled stop operation is activated by the primary ADS to decelerate the ADV based on the third controlled stop distance.

21 Claims, 9 Drawing Sheets

(56) References Cited

U.S. PATENT DOCUMENTS

| | | | |
|---|---|---|---|
| 2007/0193798 A1* | 8/2007 | Allard | G05D 1/0061 |
| | | | 180/169 |
| 2011/0009238 A1* | 1/2011 | Baba | B61B 10/04 |
| | | | 477/185 |
| 2012/0046820 A1* | 2/2012 | Allard | H04L 67/12 |
| | | | 701/25 |
| 2016/0167519 A1* | 6/2016 | Luke | B60W 10/26 |
| | | | 701/22 |
| 2018/0136669 A1* | 5/2018 | Turpin | G08G 5/045 |
| 2018/0345795 A1* | 12/2018 | Luke | B60W 10/184 |
| 2018/0354474 A1* | 12/2018 | Zhang | B60T 8/172 |
| 2019/0088148 A1* | 3/2019 | Jacobus | B60W 10/18 |
| 2019/0270450 A1* | 9/2019 | Ando | B60Q 9/008 |
| 2019/0291726 A1* | 9/2019 | Shalev-Shwartz | ............ |
| | | | B60W 60/00272 |
| 2020/0062273 A1* | 2/2020 | Nehmadi | G06K 9/00791 |
| 2020/0290642 A1* | 9/2020 | Hao | B60W 30/09 |
| 2020/0406969 A1* | 12/2020 | Ersal | B60W 30/18163 |

* cited by examiner

METHOD FOR ENHANCING IN-PATH OBSTACLE DETECTION WITH SAFETY REDUNDANCY AUTONOMOUS SYSTEM

TECHNICAL FIELD

Embodiments of the present disclosure relate generally to operating autonomous vehicles. More particularly, embodiments of the disclosure relate to in-path obstacle detection with safety redundancy autonomous system.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Safety of autonomous driving is very important. As defined in the SAE J3016 for a Level 4 autonomous vehicle, a dynamic driving task (DDT), specifically DDT fallback, is handled by a system rather than a human driver. To achieve this, current industry approaches employ redundant or diversified sensors, at least minimum safety critical redundant systems, i.e. autonomous driving computing systems, etc. Very little has been made public as to how the system capability between DDT and DDT fallback is balanced, especially how common cause failure or limitation between these two systems are reduced in order to minimize the risk.

If DDT and DDT fallback systems use the same sensor suit or if DDT fallback system use subset of the full vehicle autonomous driving system (ADS) sensor suit, common cause failure or limitation between the two systems may lead to vehicle risk. If DDT and DDT fallback systems are redundant and diversified in sensors, hardware and algorithms, then a false positive of obstacle detection by these systems may increase if an appropriate arbitration mechanism is not implemented.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
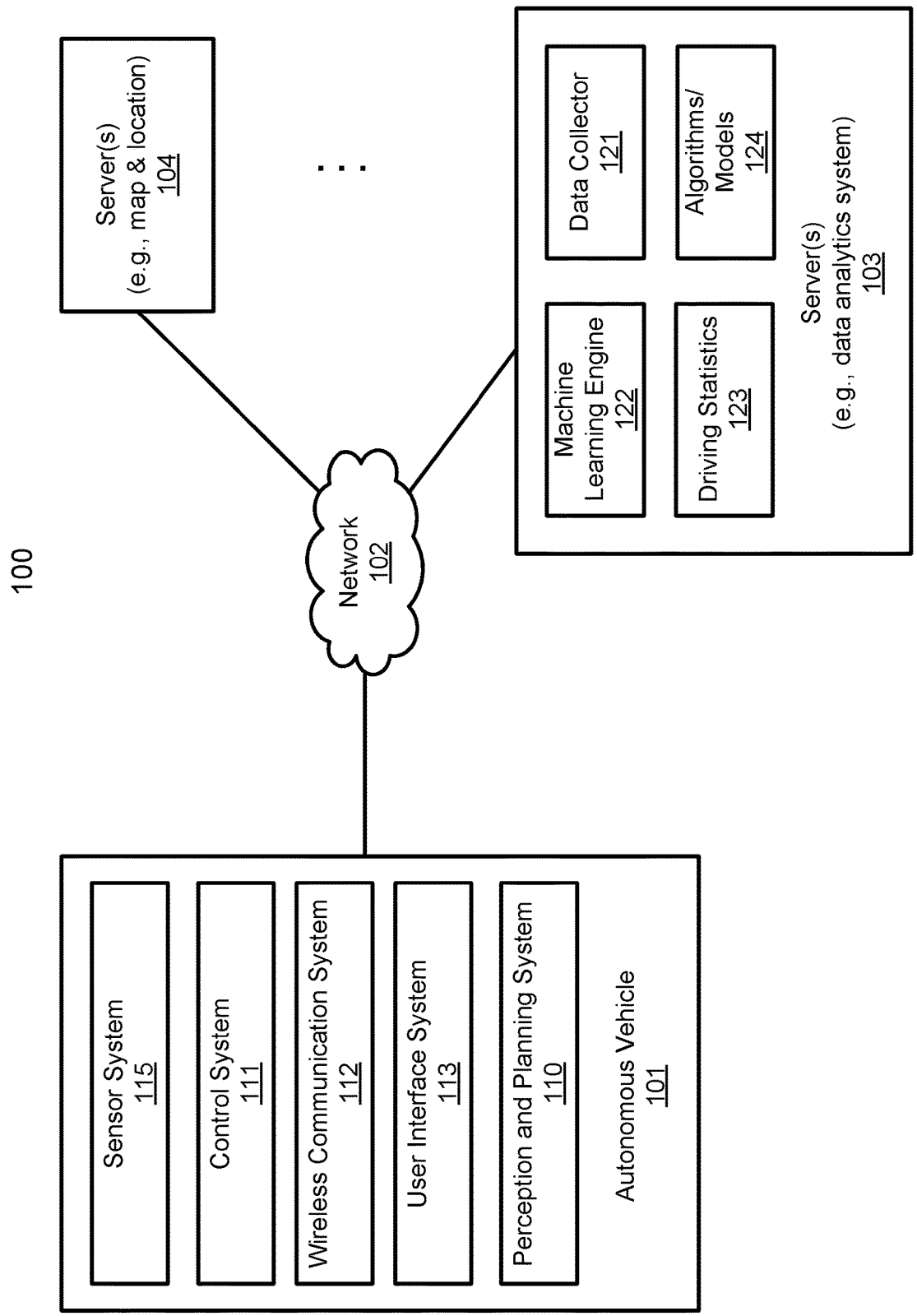
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a computer-implemented method for performing an obstacle detection for an autonomous driving vehicle (ADV) is described. An obstacle is detected by a primary autonomous driving system (ADS) and a secondary ADS using an obstacle detection algorithm based on sensor data. The sensor data are provided by sensors on an ADV. In response to detecting the obstacle, a first controlled stop distance and a second controlled stop distance are calculated by the primary ADS and secondary ADS respectively based on a speed and a deceleration capability of the ADV. Then, the first and second controlled stop distances are exchanged between the primary ADS and secondary ADS to determine a third controlled stop distance. The third controlled stop distance is the maximum of the first and second controlled stop distances. In response to determining that the ADV reaches within the third controlled distance between the ADV and the obstacle, a controlled stop operation is then activated by the primary ADS to decelerate the ADV based on the third controlled stop distance.

In one embodiment, a first emergency stop distance is calculated by the primary ADS during the controlled stop operation. Then, an emergency stop operation is activated when the ADV moves within the first emergency stop distance from the obstacle. In one embodiment, a current distance between the ADV and the obstacle is periodically measured by the primary ADS while the ADV decelerates during the controlled stop operation. The first emergency stop distance is then updated in view of the current distance and a current speed as well as deceleration capability of the ADV.

In one embodiment, a second emergency stop distance is calculated by the secondary ADS during the controlled stop operation. Then, the first and second emergency stop distances are exchanged between the primary ADS and secondary ADS to derive a third emergency stop distance based on the first and second emergency stop distances. The emergency stop operation is activated based on the third emergency stop distance. In order to select a third emergency stop distance, a longer one of the first emergency stop distance and the second emergency stop distance is selected.

Then, a longer one of the first controlled stop distance and the second controlled stop distance is selected as the third controlled stop distance.

In one embodiment, the first controlled stop distance is determined whether is different than the second controlled stopped distance. Thereafter, the obstacle detection algorithm is refined to reduce a possibility of a false positive or false negative detection of obstacles.

In another aspect of the disclosure, embodiments of the present disclosure also provide a non-transitory machine-readable medium and a data processing system perform the processes as described above.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
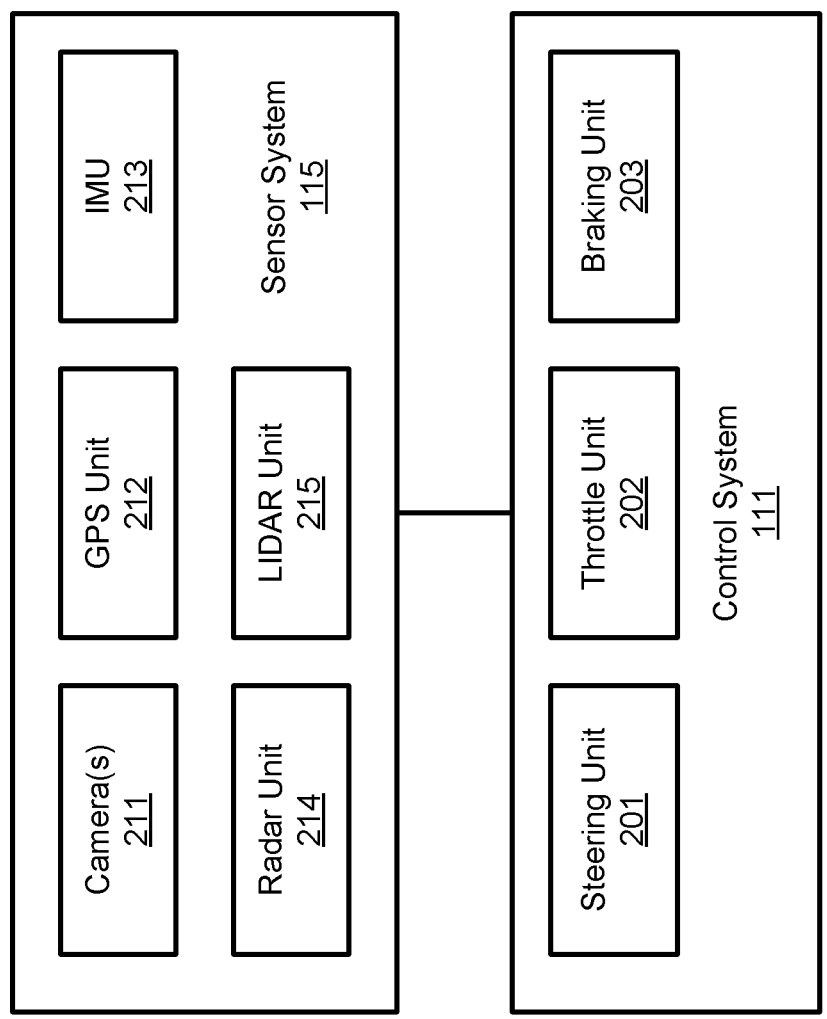
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to monitor and exchange messages between a primary ADS and a secondary ADS, as well as an algorithm to determine the controlled stop and emergency stop distance, etc. Algorithms 124 can then be uploaded on ADVs to be utilized during autonomous driving in real-time.

Figure 3A:
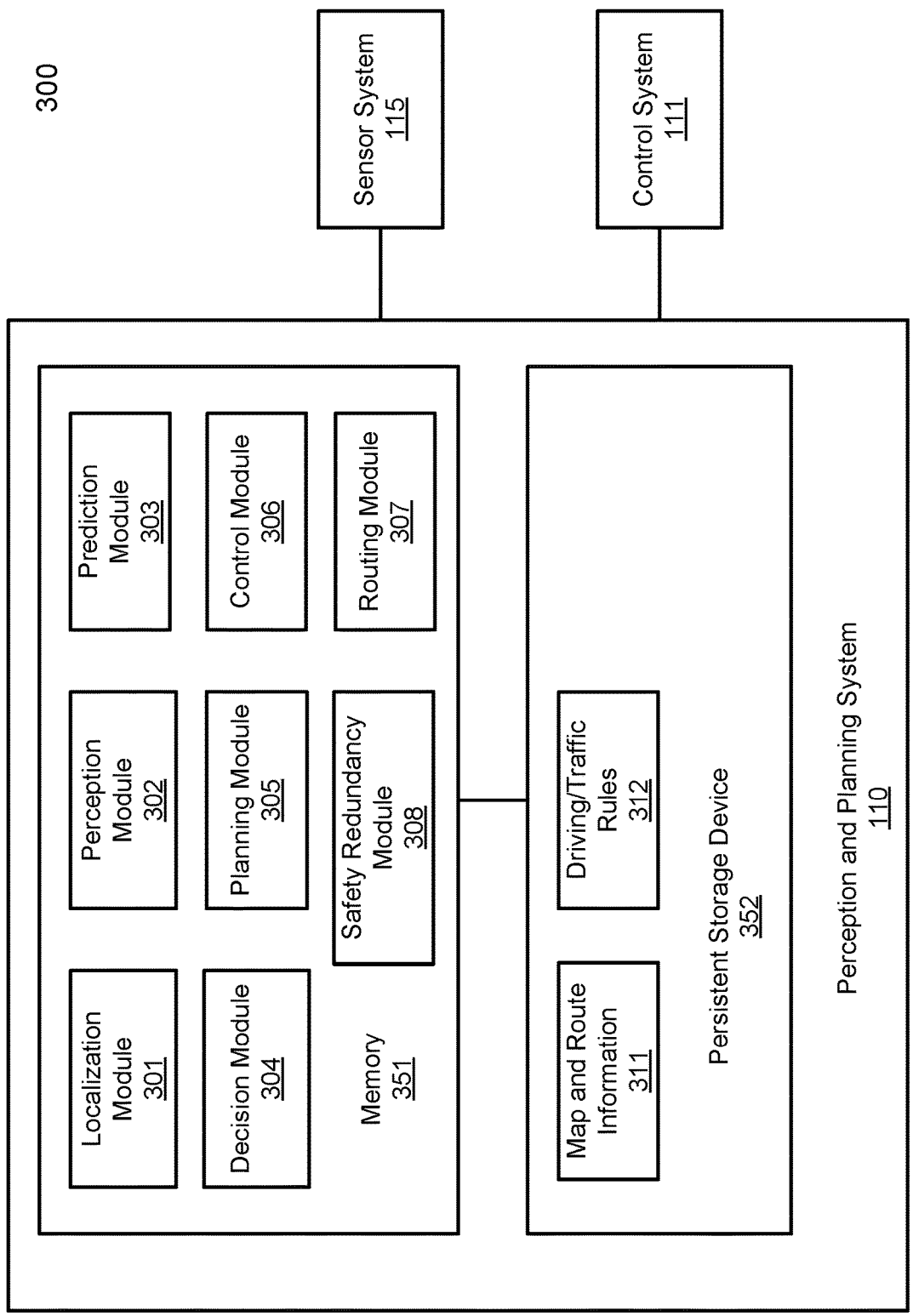
FIGS. 3A-3B are block diagrams illustrating an example of a perception and planning system used with an autonomous vehicle according to one embodiment.
Figure 3B:
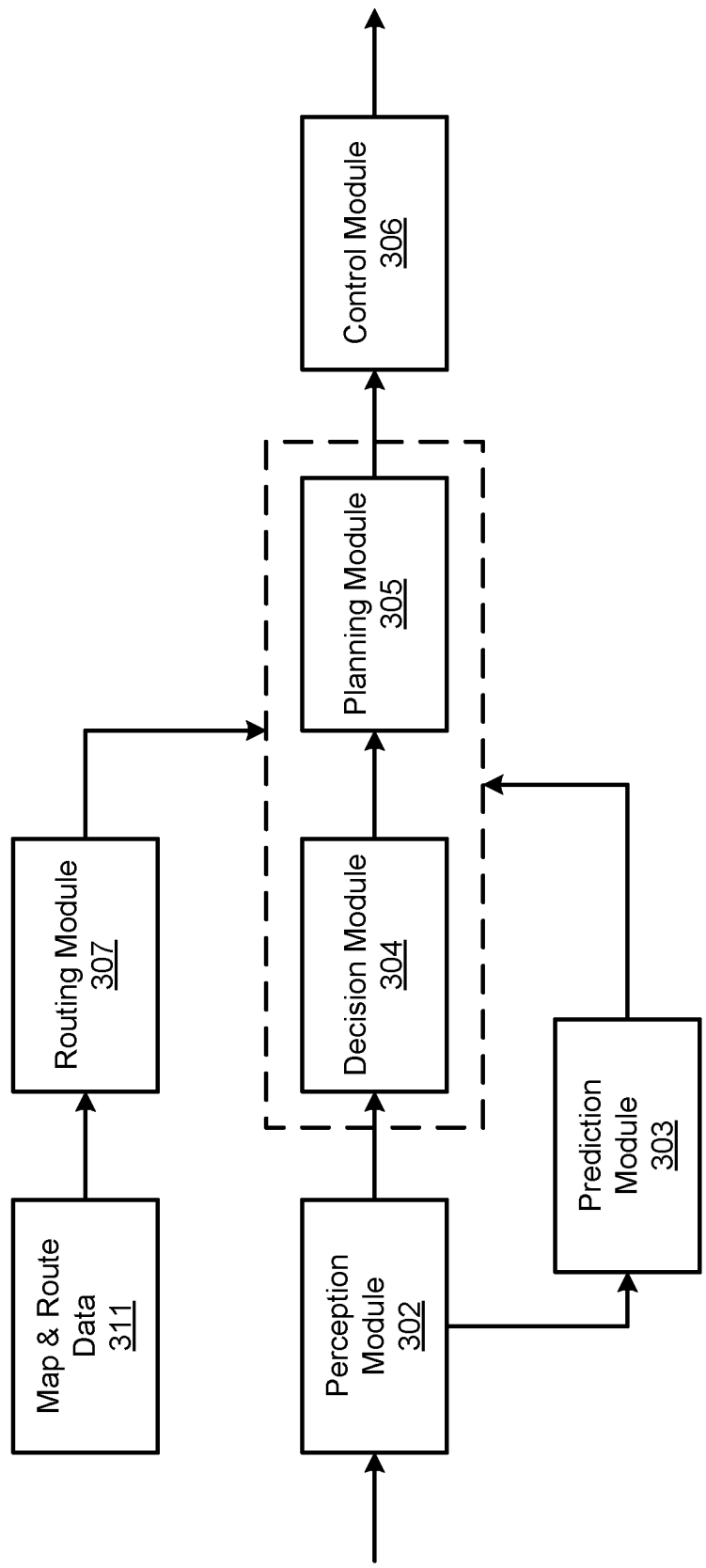

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and safety redundancy module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 5:
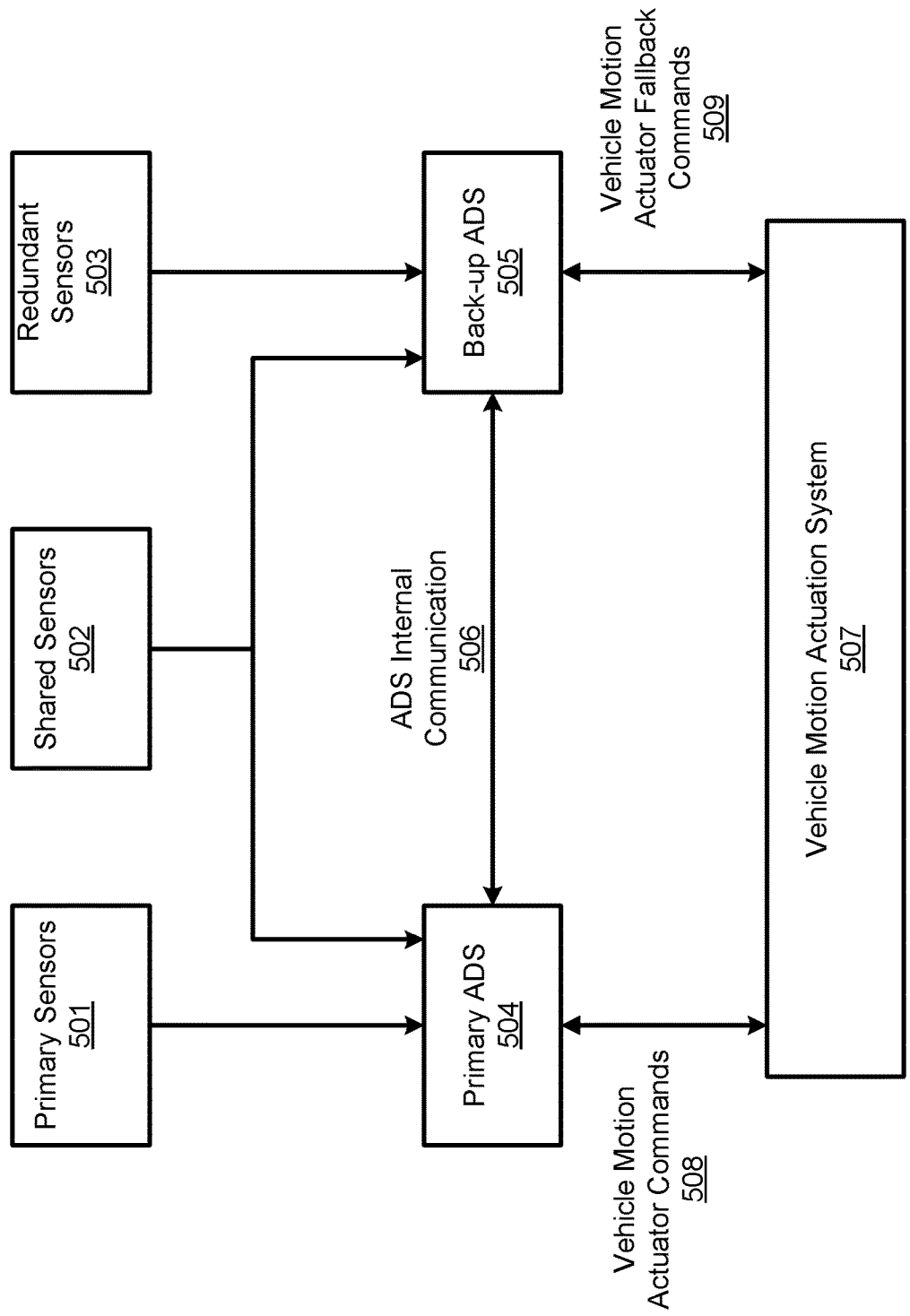
FIG. 5 is a block diagram illustrating an example of a safety redundancy autonomous driving system (ADS) according to one embodiment of the invention.

In one embodiment, a safety redundancy module 308 is configured to perform an obstacle detection for an ADV with a primary ADS and a secondary ADS. The primary ADS is responsible for a performance oriented point-to-point route operation of the ADV and the secondary ADS focuses on a system fail operation to meet minimum risk condition (MRC) in case the primary ADS is completely unavailable. Note that module 308 may be integrated with another module, such as, for example, planning module 305 and/or control module 306. Modules 301-308 may be collectively referred to as an ADS. An ADV may be equipped with at least two ADS systems: 1) a primary ADS and 2) a secondary or backup ADS, as shown in FIG. 5. Each of the primary ADS and the secondary ADS may include at least some of the modules 301-308. The primary ADS and the secondary ADS may communicate with each other over a local area network or link.

Referring to FIG. 3A, safety redundancy module 308 determines a first controlled stop distance and a second controlled stop distance by the primary ADS and the secondary ADS respectively upon detecting an in-path obstacle. The safety redundancy module 308 determines a third controlled stop distance after exchanging the first and second controlled stop distances. The safety redundancy module 308 decelerates the ADV based on the third controlled stop distance.

Figure 4:
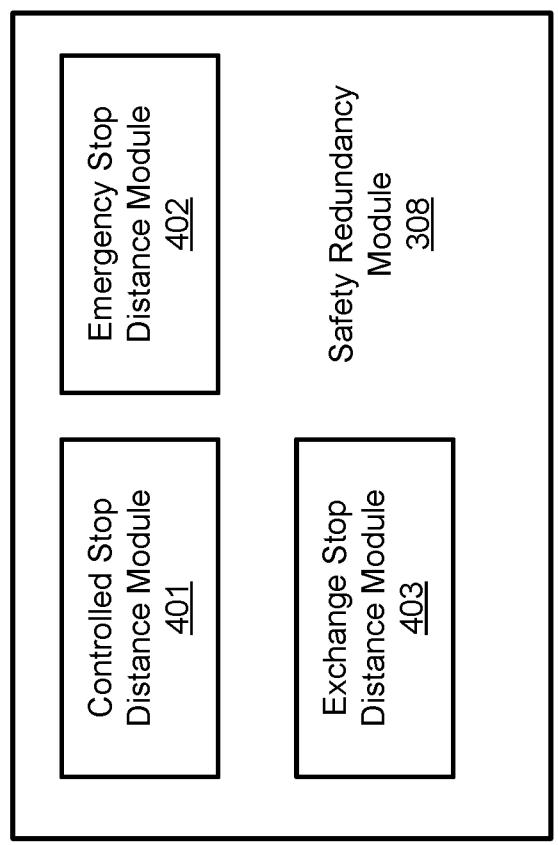
FIG. 4 is a block diagram illustrating an example of a safety redundancy module according to one embodiment of the invention.

FIG. 4 is a block diagram illustrating an example of a safety redundancy module according to one embodiment. Referring to FIG. 4, in one embodiment, safety redundancy module 308 includes, amongst others, controlled stop distance module 401 and emergency stop distance module 402. In one embodiment, in response to detecting the obstacle, controlled stop distance module 401 is configured to calculate a first controlled stop distance by the corresponding ADS and emergency stop distance module 402 is configured to calculate a second controlled stop distance by the ADS based on a speed of the ADV. The obstacle is detected by the primary ADS and the secondary ADS using an obstacle detection algorithm based on sensor data provided by sensors such as radar and/or LIDAR on the ADV. In one embodiment, the obstacle detection algorithm, for example, is provided by the perception module 302.

Exchange stop distance module 403 is configured to exchange the first and second controlled stop distances between the primary ADS and secondary ADS to determine a third controlled stop distance.

In response to determining that the ADV reaches within the third controlled distance between the ADV and the obstacle, the safety module 308 is configured to cause a controlled stop operation to be performed by the ADS to decelerate the ADV based on the third controlled stop distance. The ADS is configured to periodically measure a current distance between the ADV and the obstacle while the ADV decelerates during the controlled stop operation. Again, safety redundancy module 308 may be part of a primary ADS or a secondary ADS.

FIG. 5 is a block diagram illustrating an example of a safety redundancy autonomous driving system (ADS) according to one embodiment of the invention. Referring to FIG. 5, a safety redundancy autonomous driving system balances the capability of the performance oriented primary ADS and the safety focused secondary ADS. The ADV primary sensors 501 are in communication with and dedicated to the primary ADS 504. The ADV redundant sensors 503 are in communication with and dedicated to the secondary ADS 505. Both the primary ADS 504 and the secondary ADS 505 systems are in communication with and share the shared sensors 502. The primary ADS 504 and the secondary ADS 505 systems are in communication with ADS 502 via an internal communication link 506. In one embodiment, the ADS internal communication link 506 is used for exchanging the first and second controlled stop distances between the primary ADS and secondary ADS to determine a third controlled stop distance.

In one embodiment, the primary ADS 504 and the secondary ADS 505 systems are in communication with the vehicle motion actuation system 507. The vehicle motion actuator commands 508 are generated and issued to the vehicle motion actuation system 507 to activate a controlled stop operation by the primary ADS to decelerate the ADV based on the third controlled stop distance, in response to determining that the ADV reaches within the third controlled distance between the ADV and the obstacle.

In another embodiment, the vehicle motion actuator commands 508 are generated and issued to the vehicle motion actuation system 507 to activate an emergency stop operation when the ADV moves within the first emergency stop distance from the obstacle.

In one embodiment, the vehicle motion actuator fallback commands 509 are generated and issued to the vehicle motion actuation system 507 to activate an emergency stop operation by the secondary ADS system 505 when the ADV moves within the first emergency stop distance from the obstacle when the primary ADS system 504 fails to activate the emergency stop operation.

Figure 6:
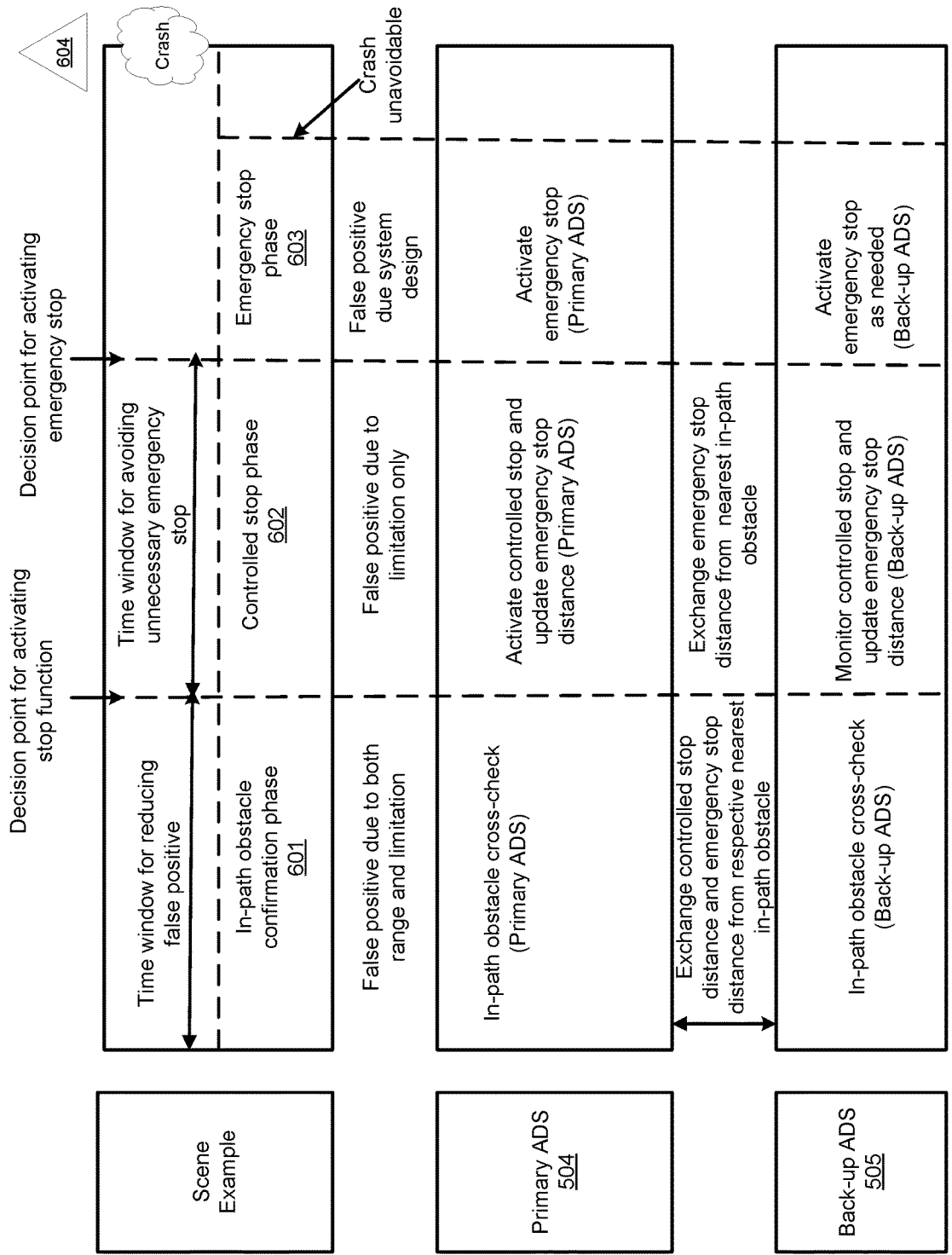
FIG. 6 is a schematic of in-path obstacle detection and risk mitigation with safety redundancy autonomous driving system according to one embodiment of the invention.

FIG. 6 is a schematic of an in-path obstacle detection and risk mitigation with safety redundancy autonomous driving system according to one embodiment of the invention. Referring to FIG. 6, a two-stage cross-confirmation method is used to reduce false positive each of the primary ADS 504 and the secondary (back-up) ADS 505 systems may bring in terms of obstacle detection. False positive occurs when the primary ADS 504 and the secondary (back-up) ADS 505 systems detect an obstacle that is not really there. In other words, both systems detect a ghost obstacle which leads the ADV to take unnecessary risks or actions to avoid the ghost obstacle.

In one embodiment, the safety redundancy module 308 of primary ADS 504 and/or secondary ADS 505 is configured to acquire and update the ADV deceleration capability and the ADV speed from the ADV chassis system prior to entering an in-path obstacle confirmation phase 601. Deceleration capability can refer to the maximum deceleration vehicle can achieve under a current condition, and this can change especially when the road surface condition changes, i.e. dry, wet, snow-covered, or icy, etc.

In one embodiment, during the in-path obstacle confirmation phase 601, both the primary ADS 504 and the secondary ADS 505 detect an obstacle 604 using an obstacle detection algorithm based on sensor data provided by sensors on the ADV. The in-path obstacle confirmation phase 601 provides a time window for reducing false positive of obstacle detection.

During the in-path obstacle confirmation phase 601, the safety redundancy module 308 is configured to calculate a first controlled stop distance and a second controlled stop distance by the primary ADS and secondary ADS respectively based on a speed of the ADV in response to detecting the obstacle 604. The safety redundancy module 308 then exchanges the first and second controlled stop distances between the primary ADS and secondary ADS to determine a third controlled stop distance.

In various embodiments, there are three possible scenarios of an obstacle detection during the in-path obstacle confirmation phase 601. The first scenario is when both the primary ADS 504 and the secondary ADS 505 do not detect an in-path obstacle 604 within the detection range of both systems. This scenario can happen when either there is no obstacle detected within the detection range of both primary ADS 504 and the secondary ADS 505 systems or both the primary ADS 504 and the secondary ADS 505 experience false negative of the obstacle detection simultaneously. False negative of the obstacle detection occurs when the primary ADS 504 and the secondary ADS 505 systems do not detect the obstacle which results in a missing obstacle.

The second scenario occurs when the in-path obstacle is observed by only one of the primary ADS 504 and the secondary ADS 505 systems. The second scenario can happen when one of the primary ADS 504 and the secondary ADS 505 systems experience a false negative, while the other correctly detects an in-path obstacle. The second scenario can also occur when one of the primary ADS 504 and the secondary ADS 505 systems experiences a false positive, while the other correctly detects an in-path obstacle. Under any circumstances, by exchanging stop distance either controlled or emergency, attention can be paid to a specific area for further confirmation of in-path obstacle detection.

The third scenario occurs when an in-path obstacle is observed by both the primary ADS 504 and the secondary ADS 505 systems, but both systems produce significantly different in a calculated controlled stop distance. This scenario can be regarded as a special case of the second scenario. Since maximum controlled stop distance is calculated which may be due to a false positive, this provides an additional time for an in-path obstacle detection and confirmation during this phase.

The in-path obstacle confirmation phase 601 is followed by a controlled stop phase 602. The controlled stop phase 602 marks a decision point for activating controlled stop function. The controlled stop phase 602 provides the ADV with a time window for avoiding unnecessary emergency stop.

During the controlled stop phase 602, the safety redundancy control module 308 is configured to activate a controlled stop operation by the primary ADS to decelerate the ADV based on the third controlled stop distance, in response to determining that the ADV reaches within the third controlled distance between the ADV and the obstacle 604.

In the controlled stop phase 602, a first emergency stop distance is calculated by the primary ADS during the controlled stop operation. A current distance between the ADV and the obstacle 604 while the ADV decelerates during the controlled stop operation is periodically measured by the primary ADS. The first emergency stop distance is updated in view of the current distance and a current speed of the ADV.

In one embodiment, a second emergency stop distance by the secondary ADS during the controlled stop operation is calculated. During the controlled stop phase 602, the first and second emergency stop distances are exchanged between the primary ADS and secondary ADS to derive a third emergency stop distance based on the first and second emergency stop distances. In one embodiment, the emergency stop operation is activated based on the third emergency stop distance.

Once entering controlled stop phase 602 by activating controlled stop operation via the primary ADS 504, the first and second emergency stop distances are exchanged between the primary ADS and secondary ADS to fine tune the in-path obstacle detection and avoid an unnecessary emergency stop.

In one embodiment, a longer one of the first emergency stop distance and the second emergency stop distance is selected as the third emergency stop distance.

In one embodiment, a longer one of the first controlled stop distance and the second controlled stop distance is selected as the third controlled stop distance.

In one embodiment, it is determined whether the first controlled stop distance is different than the second controlled stopped distance. The obstacle detection algorithm is refined to reduce a possibility of a false positive or false negative detection of obstacles.

In one embodiment, an emergency stop phase 603 follows the controlled stop phase 602. The emergency stop phase 603 marks the decision point for activating an emergency stop operation. During the emergency stop phase 603, an emergency stop operation is activated when the ADV moves within the first emergency stop distance from the obstacle. An emergency stop operation is activated by the secondary ADS 505 if the primary ADS 504 fails to activate the emergency stop.

Figure 7:
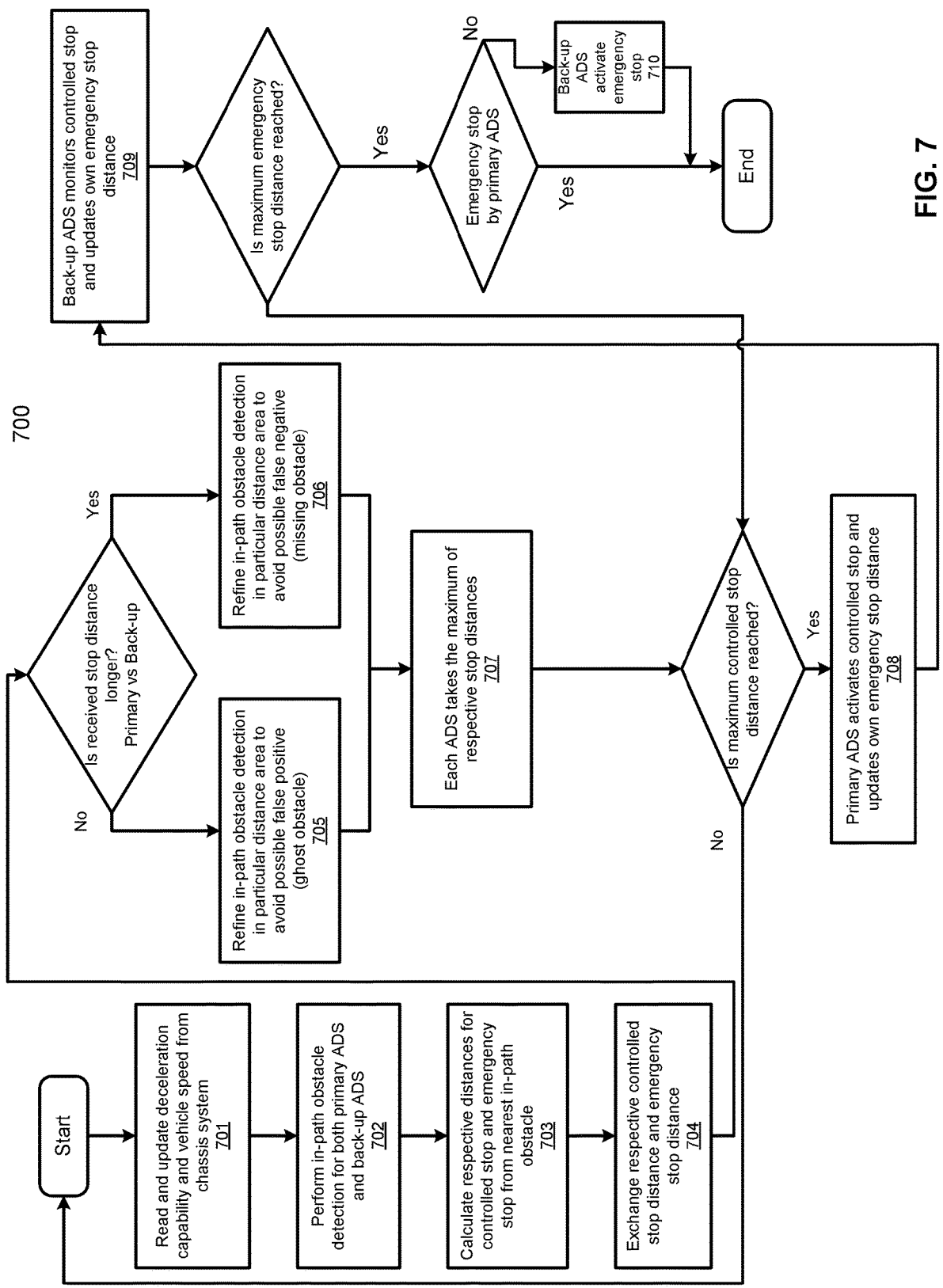
FIG. 7 is a flow diagram of a two-stage cross-confirmation method for in-path obstacle detection with safety redundancy autonomous driving system according to one embodiment of the invention.

FIG. 7 is a flow diagram of a two-stage cross-confirmation method for in-path obstacle detection with safety redundancy autonomous driving system according to one embodiment of the invention. Process 700 may be performed by processing logic which may include software, hardware, or a combination thereof. For example, process 800 may be performed by safety redundancy module 308 of FIGS. 3A and 4.

Referring to FIG. 7, in operation 701, processing logic acquires and updates the deceleration capability and the ADV speed from the chassis system. In operation 702, processing logic detects an obstacle by a primary autonomous driving system (ADS) and a secondary ADS using an obstacle detection algorithm based on sensor data provided by sensors on the ADV. In operation 703, the processing logic calculates a first controlled stop distance and a second controlled stop distance by the primary ADS and secondary ADS respectively based on a speed of the ADV in response to detecting the obstacle. In operation 704, the processing logic exchanges the first and second controlled stop distances between the primary ADS and secondary ADS to determine a third controlled stop distance.

Then, the processing logic compares the calculated first controlled stop distance and the second controlled stop distance to determine whether the first controlled stop distance is different than the second controlled stopped distance. In operation 706, if it is determined that the calculated first controlled stop distance is longer than the second controlled stopped distance, the processing logic refines the obstacle detection algorithm to reduce a possibility of a false negative detection of obstacles. In operation 707, if it is determined that the calculated second controlled stop distance is longer than the first controlled stopped distance, the processing logic refines the obstacle detection algorithm to reduce a possibility of a false positive detection of obstacles.

In operation 707, the processing logic selects a longer one of the first controlled stop distance and the second controlled stop distance as the third controlled stop distance.

Then, the processing logic determines whether the ADV reaches within the third controlled distance between the ADV and the obstacle. In operation 708, if it is determined that the ADV reaches within the third controlled distance between the ADV and the obstacle, the processing logic activates a controlled stop operation by the primary ADS to decelerate the ADV based on the third controlled stop distance. In operation 708, the processing logic calculates a first emergency stop distance by the primary ADS during the controlled stop operation. The processing logic calculates a first emergency stop distance by the primary ADS during the controlled stop operation. The processing logic activates an emergency stop operation when the ADV moves within the first emergency stop distance from the obstacle.

In operation 709, the processing logic calculates a second emergency stop distance by the secondary ADS during the controlled stop operation. The processing logic exchanges the first and second emergency stop distances between the primary ADS and secondary ADS to derive a third emergency stop distance based on the first and second emergency stop distances, wherein the emergency stop operation is activated based on the third emergency stop distance.

The processing logic selects a longer one of the first emergency stop distance and the second emergency stop distance as the third emergency stop distance.

The processing logic determines whether the ADV reaches within the third emergency stop distance between the ADV and the obstacle. If it is determined that the ADV reaches within the third emergency stop distance between the ADV and the obstacle, the processing logic activates an emergency stop operation when the ADV moves within the third emergency stop distance from the obstacle. In operation 710, if it is determined that the processing logic does not activate an emergency stop operation when the ADV moves within the third emergency stop distance from the obstacle, the emergency stop operation is activated by the secondary ADS.

Figure 8:
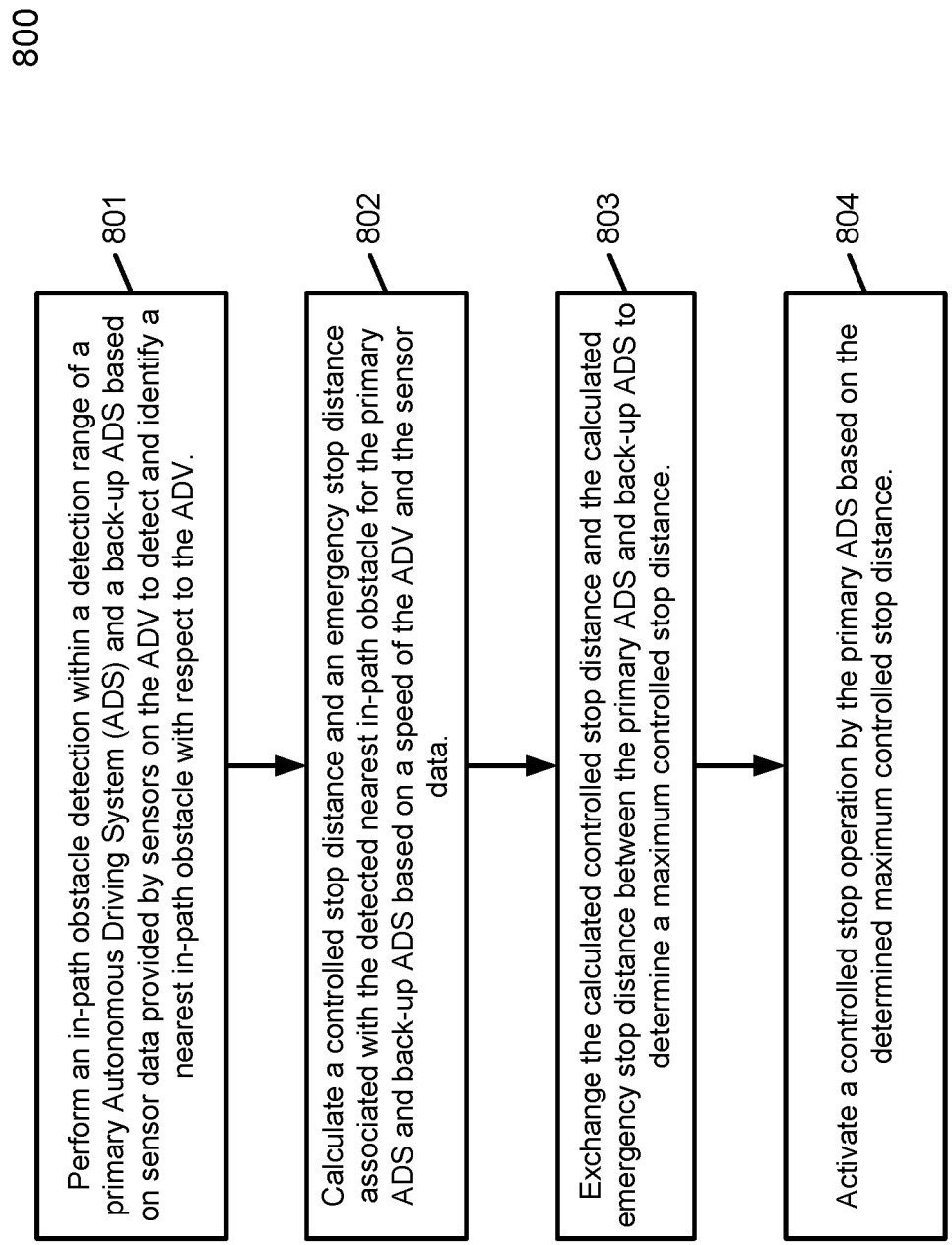
FIG. 8 is a flow diagram illustrating a process of operating an autonomous driving vehicle according to one embodiment of the invention.

FIG. 8 is a flow diagram illustrating a process of operating an autonomous driving vehicle according to one embodiment of the invention. Process 800 may be performed by processing logic which may include software, hardware, or a combination thereof. For example, process 800 may be performed by safety redundancy module 308 of FIGS. 3A and 4. Referring to FIG. 8, in operation 801, processing logic detects an obstacle by a primary autonomous driving system (ADS) and a secondary ADS using an obstacle detection algorithm based on sensor data provided by sensors on the ADV. In operation 802, processing logic calculates a first controlled stop distance and a second controlled stop distance by the primary ADS and secondary ADS respectively based on a speed of the ADV in response to detecting the obstacle.

In operation 803, processing logic exchanges the first and second controlled stop distances between the primary ADS and secondary ADS to determine a third controlled stop distance. In operation 804, processing logic activates a controlled stop operation by the primary ADS to decelerate the ADV based on the third controlled stop distance, in response to determining that the ADV reaches within the third controlled distance between the ADV and the obstacle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for performing an obstacle detection for an autonomous driving vehicle (ADV), the method comprising:
   detecting an obstacle by a primary autonomous driving system (ADS) and a secondary ADS using an obstacle detection algorithm based on sensor data provided by a plurality of sensors on the ADV;
   calculating a first controlled stop distance and a second controlled stop distance by the primary ADS and secondary ADS respectively based on a speed and a deceleration capability of the ADV in response to detecting the obstacle;
   exchanging the first and second controlled stop distances between the primary ADS and secondary ADS to determine a third controlled stop distance; and
   activating a controlled stop operation by the primary ADS to decelerate the ADV based on the third controlled stop distance, in response to determining that the ADV reaches within the third controlled distance between the ADV and the obstacle.

2. The method of claim 1, further comprising:
   calculating a first emergency stop distance by the primary ADS during the controlled stop operation; and
   activating an emergency stop operation when the ADV moves within the first emergency stop distance from the obstacle.

3. The method of claim 2, further comprising:
   periodically measuring by the primary ADS a current distance between the ADV and the obstacle while the ADV decelerates during the controlled stop operation;

and updating the first emergency stop distance in view of the current distance, a current speed, and the deceleration capability of the ADV.

4. The method of claim 2, further comprising:
calculating a second emergency stop distance by the secondary ADS during the controlled stop operation; and
exchanging the first and second emergency stop distances between the primary ADS and secondary ADS to derive a third emergency stop distance based on the first and second emergency stop distances, wherein the emergency stop operation is activated based on the third emergency stop distance.

5. The method of claim 4, further comprising selecting a longer one of the first emergency stop distance and the second emergency stop distance as the third emergency stop distance.

6. The method of claim 1, further comprising selecting a longer one of the first controlled stop distance and the second controlled stop distance as the third controlled stop distance.

7. The method of claim 1, further comprising:
determining whether the first controlled stop distance is different than the second controlled stop distance; and
refining the obstacle detection algorithm to reduce a possibility of a false positive or false negative detection of obstacles.

8. A non-transitory machine-readable medium having instructions stored therein, which when executed by a processor, cause the processor to perform operations of an obstacle detection for an autonomous driving vehicle (ADV), the operations comprising:
detecting an obstacle by a primary autonomous driving system (ADS) and a secondary ADS using an obstacle detection algorithm based on sensor data provided by a plurality of sensors on the ADV;
calculating a first controlled stop distance and a second controlled stop distance by the primary ADS and secondary ADS respectively, based on a speed and a deceleration capability of the ADV in response to detecting the obstacle;
exchanging the first and second controlled stop distances between the primary ADS and secondary ADS to determine a third controlled stop distance; and
activating a controlled stop operation by the primary ADS to decelerate the ADV based on the third controlled stop distance, in response to determining that the ADV reaches within the third controlled distance between the ADV and the obstacle.

9. The machine-readable medium of claim 8, wherein the operations further comprise:
calculating a first emergency stop distance by the primary ADS during the controlled stop operation; and
activating an emergency stop operation when the ADV moves within the first emergency stop distance from the obstacle.

10. The machine-readable medium of claim 9, wherein the operations further comprise:
periodically measuring by the primary ADS a current distance between the ADV and the obstacle while the ADV decelerates during the controlled stop operation; and updating the first emergency stop distance in view of the current distance, a current speed, and the deceleration capability of the ADV.

11. The machine-readable medium of claim 9, wherein the operations further comprise:
calculating a second emergency stop distance by the secondary ADS during the controlled stop operation; and
exchanging the first and second emergency stop distances between the primary ADS and secondary ADS to derive a third emergency stop distance based on the first and second emergency stop distances, wherein the emergency stop operation is activated based on the third emergency stop distance.

12. The machine-readable medium of claim 11, wherein the operations further comprise selecting a longer one of the first emergency stop distance and the second emergency stop distance as the third emergency stop distance.

13. The machine-readable medium of claim 8, wherein the operations further comprise selecting a longer one of the first controlled stop distance and the second controlled stop distance as the third controlled stop distance.

14. The machine-readable medium of claim 8, wherein the operations further comprise:
determining whether the first controlled stop distance is different than the second controlled stop distance; and
refining the obstacle detection algorithm to reduce a possibility of a false positive or false negative detection of obstacles.

15. A data processing system, comprising:
a processor; and
a memory coupled to the processor to store instructions, which when executed by the processor, cause the processor to perform operations of an obstacle detection for an autonomous driving vehicle (ADV), the operations including:
detecting an obstacle by a primary autonomous driving system (ADS) and a secondary ADS using an obstacle detection algorithm based on sensor data provided by a plurality of sensors on the ADV;
calculating a first controlled stop distance and a second controlled stop distance by the primary ADS and secondary ADS respectively based on a speed and a deceleration capability of the ADV in response to detecting the obstacle;
exchanging the first and second controlled stop distances between the primary ADS and secondary ADS to determine a third controlled stop distance; and
activating a controlled stop operation by the primary ADS to decelerate the ADV based on the third controlled stop distance, in response to determining that the ADV reaches within the third controlled distance between the ADV and the obstacle.

16. The system of claim 15, wherein the operations further comprise:
calculating a first emergency stop distance by the primary ADS during the controlled stop operation; and
activating an emergency stop operation when the ADV moves within the first emergency stop distance from the obstacle.

17. The system of claim 16, wherein the operations further comprise:
periodically measuring by the primary ADS a current distance between the ADV and the obstacle while the ADV decelerates during the controlled stop operation; and updating the first emergency stop distance in view of the current distance, a current speed, and the deceleration capability of the ADV.

18. The system of claim 16, wherein the operations further comprise:

calculating a second emergency stop distance by the secondary ADS during the controlled stop operation; and exchanging the first and second emergency stop distances between the primary ADS and secondary ADS to derive a third emergency stop distance based on the first and second emergency stop distances, wherein the emergency stop operation is activated based on the third emergency stop distance.

19. The system of claim 18, wherein the operations further comprise selecting a longer one of the first emergency stop distance and the second emergency stop distance as the third emergency stop distance.

20. The system of claim 15, wherein the operations further comprise selecting a longer one of the first controlled stop distance and the second controlled stop distance as the third controlled stop distance.

21. The system of claim 15, wherein the operations further comprise:

determining whether the first controlled stop distance is different than the second controlled stop distance; and refining the obstacle detection algorithm to reduce a possibility of a false positive or false negative detection of obstacles.

* * * * *